United States Patent
Nagasuka et al.

(10) Patent No.: US 7,124,246 B2
(45) Date of Patent: Oct. 17, 2006

(54) STORAGE MANAGEMENT METHOD AND SYSTEM

(75) Inventors: Hirofumi Nagasuka, Sagamihara (JP); Masaru Satou, Yokohama (JP); Kenichi Oyamada, Yokohama (JP); Katsuhisa Miyata, Yokohama (JP); Atsushi Tanaka, Atsugi (JP); Shuuzou Takeo, Kawasaki (JP); Masaya Ichikawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 149 days.

(21) Appl. No.: 10/847,915

(22) Filed: May 19, 2004

(65) Prior Publication Data

US 2005/0210192 A1    Sep. 22, 2005

(30) Foreign Application Priority Data

Mar. 22, 2004    (JP)    ............................. 2004-082186

(51) Int. Cl.
G06F 12/00    (2006.01)

(52) U.S. Cl. ...................... 711/114; 711/161; 711/162; 711/203

(58) Field of Classification Search .................. None
See application file for complete search history.

(56) References Cited

U.S. PATENT DOCUMENTS

| | | | |
|---|---|---|---|
| 6,173,362 B1 | 1/2001 | Yoda | |
| 6,895,485 B1 | 5/2005 | DeKoning et al. | |
| 6,925,541 B1 | 8/2005 | Yamagami | |
| 2002/0103969 A1* | 8/2002 | Koizumi et al. | ............ 711/114 |
| 2003/0188085 A1 | 10/2003 | Arakawa et al. | |
| 2003/0191909 A1 | 10/2003 | Asano et al. | |
| 2003/0204701 A1* | 10/2003 | Mimatsu et al. | ............. 711/203 |
| 2003/0236945 A1* | 12/2003 | Nahum | ........................ 711/114 |
| 2004/0044855 A1* | 3/2004 | Carlson et al. | ............. 711/154 |
| 2004/0123063 A1* | 6/2004 | Dalal et al. | .................. 711/170 |
| 2005/0050271 A1 | 3/2005 | Honda et al. | |
| 2005/0076070 A1* | 4/2005 | Mikami | ....................... 707/204 |
| 2005/0076157 A1* | 4/2005 | Serizawa et al. | ............... 710/1 |
| 2005/0154852 A1 | 7/2005 | Nakagawa et al. | |

FOREIGN PATENT DOCUMENTS

JP    2003-303054    10/2003

\* cited by examiner

*Primary Examiner*—Mano Padmanabhan
*Assistant Examiner*—Mardochee Chery
(74) *Attorney, Agent, or Firm*—Mattingly, Stanger, Malur & Brundidge, P.C.

(57) ABSTRACT

A storage system is disclosed comprising a management computer and multiple storage subsystems with multiple volumes accessible to a host computer. The host computer sends volume configuration information to the management computer. Each storage subsystem retrieves information from the volume directory corresponding to a requested volume and sends it to the management computer. The management computer comprises a volume information table holding the volume configuration information obtained from the host computer, information on storage subsystems, and use-related ID group IDs; a unit which identifies the volumes belonging to a specified group ID, locates the storage subsystems these volumes belong to, and obtains information on the desired volumes from their corresponding volume directories; and a display device which displays information on the usage of the volumes that is obtained from storage subsystems. Thus, volume information in multiple storage subsystems can be collected in an integrated manner, thereby reducing management overhead.

5 Claims, 7 Drawing Sheets

| NUMBER OF ENTRIES | STORAGE SUBSYSTEM ID | VOLUME ID | PHYSICAL ADDRESS | STORAGE SUBSYSTEM ID | VOLUME ID | PHYSICAL ADDRESS |
|---|---|---|---|---|---|---|
| 4161 | 4162 | 4163 | 4164 | 4362 | 4363 | 4364 |

GROUP DEFINITION FILE 125

| GROUP NAME | VOLUME ID | STORAGE SUBSYSTEM ID |
|---|---|---|
| A | VOL1 | 1 |
| A | VOL4 | 2 |
| B | VOL2 | 1 |
| B | VOL3 | 2 |

VOLUME INFORMATION TABLE 16

| STORAGE SUBSYSTEM ID | VOLUME ID | PHYSICAL ADDRESS | GROUP NAME |
|---|---|---|---|
| 1 | VOL1 | 1 | A |
| 1 | VOL2 | 2 | B |
| 2 | VOL3 | 1 | B |
| 2 | VOL4 | 2 | A |

FIG. 7

FORMAT OF VOLUME DIRECTORY INFORMATION

```
311              31
GROUP    A
  312   313   314       315       316     317
STORAGE  VOL   FILE      ALLOC     USE    UTILIZATION
  ID                     (MB)     (MB)      (%)

1      VOL1  AAA.DATA   5000    4000       80
               BBB.DATA  40000       0        0
               CCC.DATA   1000     900       90
               DDD.DATA 200000  100000       50

2      VOL4  EEE.DATA    500     200       40
               FFF.DATA     20      10       50
               GGG.DATA    100       5        5
               HHH.DATA    300     100       33
               III.DATA    150     100       66
```

STORAGE MANAGEMENT METHOD AND SYSTEM

CLAIM OF PRIORITY

The present application claims priority from Japanese application serial No.2004-82186, filed on (Mar. 22, 2004), the content of which is hereby incorporated by reference into this application.

BACKGROUND OF THE INVENTION

The present invention relates to a storage management method and system, and more specifically to a method for monitoring the status of storage usage in a computer system having a large number of storage units. Compound computer systems in which a number of host computers carry out jobs while sharing, or exclusively using, logical areas allocated in storage units such as disks are in common use. In such compound computer environments, as the system becomes more large-scale or the jobs become more diversified, it is increasingly demanded that a large variety of data be handled efficiently by a storage subsystem. In addition, such demand needs to be satisfied while reducing the overall storage management cost. To meet these requirements, it is important to build an environment which allows the information on storage usage and file allocation to be obtained efficiently.

A number of methods for managing storage usage have been proposed. For example, Laid-open Patent Specification No. 2003-303054 discloses an arrangement in which each storage subsystem monitors and manages the storage usage inside it by itself. More specifically, each of the storage subsystems is provided with a management module, which constantly monitors the usage of each volume in it by the user's computers and informs the user of the storage usage status whenever there is a change in it. This arrangement allows storage usage to be monitored and managed efficiently, without getting the user's computer to be involved.

SUMMARY OF THE INVENTION

In the prior art disclosed above, each storage subsystem monitors the use of all the volumes residing in it and saves the monitor data in itself. Therefore, to operate and monitor a large-scale system having a plurality of storage subsystems, it becomes necessary to collect and analyze the monitor data from all the storage subsystems. This means that the individual data collected from all the subsystems must be integrated into one set of coherent data, which in itself constitutes some processing calling for a non-trivial amount of load.

It is an object of the present invention to provide a method and system for collecting volume information from a plurality of storage subsystems in an integrated manner, thereby decreasing overhead. It is another object of the invention to provide a method and system for obtaining information on multiple volumes spanning multiple storage subsystems on a group basis, thereby increasing operation efficiency.

The invention features a storage system comprising one or more storage subsystems each containing one or more volumes and a management computer for managing the configuration of these storage subsystems, so arranged that volumes in the storage subsystems are made available to a host computer connected to it. More specifically, the host computer has a configuration information send unit which sends to the management computer the information on the configuration of the volumes it can access in each storage subsystem. Each storage subsystem has a volume information management unit which obtains information on a requested volume from its corresponding volume directory and sends it to the management computer. The management computer has a volume information table which, for each volume, holds volume configuration information obtained from the configuration information send unit in the host computer, information on the storage subsystem it belongs to, and its corresponding group identification (hereinafter abbreviated to "ID") (pre-assigned according to its purpose) in a coordinated manner; a volume information acquisition unit which, by identifying the volumes belonging to a specified group ID, locating the storage subsystems these volumes belong to, and determining the desired volumes in these storage subsystems, obtains information on the desired volumes from their corresponding volume directories; and a display device which displays information at least on volume usage. In this manner, the information on the usage of volumes obtained by the volume information acquisition unit is displayed by group on the display device.

In a preferred embodiment of the invention, the host computer organizes the volume IDs of all the volumes in the storage subsystems it can access and their corresponding physical addresses into a configuration information file, from which the configuration information send unit obtains data as volume configuration information.

In a preferred embodiment, the volume information table holds, for each volume, its volume ID obtained from the configuration information send unit, the physical address corresponding to its volume ID, the ID of the storage subsystem it belongs to, and the group ID pre-assigned to it according to its use, in a format maintaining coordination among them.

In a preferred embodiment, the volume information acquisition unit first identifies the volumes belonging to the group ID specified through an input device, and for each such volume, locates the storage subsystem it belongs to using the storage subsystem ID, and finally obtains information on the desired volume held in its corresponding volume directory by specifying its volume name and physical address.

In a preferred embodiment, the volume directory holds, for each volume, its volume ID, the number of files contained in it, and the information on these files. The information on files includes, for example, file name, file's start address inside the volume, allocated capacity, actual area used by file, and file's date of creation.

In a preferred embodiment, the volume directory or the information on where it resides is stored in a predetermined location in the volume. The present invention should also be viewed as an invention concerning the host computer as well as the storage subsystem depicted above in the storage management method and system.

The invention should also be viewed as an invention featuring the management computer depicted above for managing the usage of one or more storage subsystems each of which contains one or more volumes made available to a host computer. More specifically, the management computer comprises a display device for displaying volume usage; an input device for entering information necessary for management; a memory containing a volume information table which, for each volume, holds information obtained from the host computer concerning the volumes in the storage subsystem, information on the storage subsystem it belongs to, and its corresponding group ID (pre-assigned according to its purpose) in a coordinated manner; and a CPU which identifies the volumes belonging to the group ID specified through an input device, and for each such volume, locates the storage subsystem it belongs to, locates the desired volume in this storage subsystem, and finally obtains information on the desired volume from its corresponding volume directory. The management computer thus obtains information on the usage of the volumes belonging to a specified group from their corresponding storage subsystem and displays it on the display device.

In a preferred embodiment, the volume information table holds, for each volume, its volume ID obtained, the physical address corresponding to its volume ID, the ID of the storage subsystem it belongs to, and the group ID pre-assigned to it according to its use, in a format maintaining coordination among them.

In a preferred embodiment, the volume usage information displayed on the display device includes group ID, storage subsystem ID, volume ID, file names, and the status of file usage. The file usage information includes, for each file, the allocated capacity, the actual area used by it, and its utilization rate.

The present invention should also be viewed as an invention of a storage management method for managing the usage of one or more storage subsystems, each comprising one or more volumes. More specifically, the method consists essentially of the steps of registering in a table in a coordinated manner the volume configuration information for the storage subsystems obtained from the host computer, the information concerning the storage subsystem each volume belongs to, and the group ID pre-assigned to each volume according to its use; identifying the volumes belonging to the group specified by the group ID given through an input device, locating the storage subsystems these volumes belong to, and obtaining the information on the desired volumes from their corresponding volume directories; and extracting information concerning volume usage from the information thus obtained from the volume directories and displaying it in a format arranged by group on a display device.

In a preferred embodiment, the above-mentioned table holds, for each volume, its volume ID obtained, the physical address corresponding to its volume ID, the ID of the storage subsystem it belongs to, and the group ID pre-assigned to it according to its use, in a format maintaining coordination among them.

In a preferred embodiment, the volume usage information displayed on the display device includes group ID, storage subsystem ID, volume ID, file names, and the status of file usage.

The invention should also be viewed as a set of programs for executing the above-mentioned steps.

The present invention allows information on the volumes contained in a plurality of storage subsystems to be collected in an integrated manner, thereby reducing the overhead associated with such information collection. It also allows information on a plurality of volumes spanning a plurality of storage subsystems to be obtained by group, thereby improving operational efficiency.

Furthermore, the invention enhances flexibility and immunity from changes in system configuration, since it eliminates the necessity of being aware of the connections and correspondences between host computers and volumes residing in a plurality of storage subsystems.

DESCRIPTION OF THE PREFERRED EMBODIMENT

The best mode for carrying out the claimed invention will now be described by way of example and with reference to the accompanying drawings.

Figure 1:
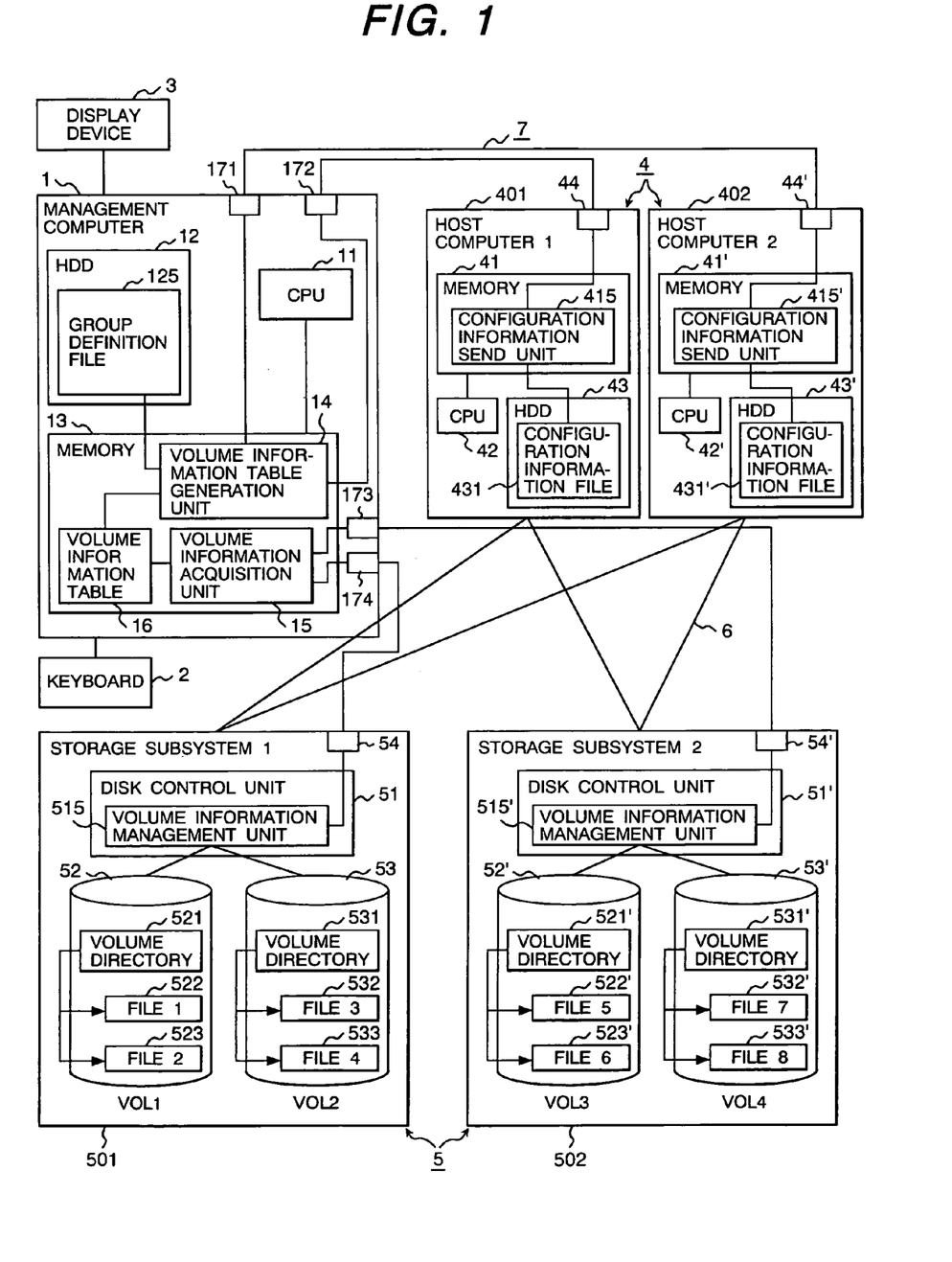
FIG. 1 is a block diagram illustrating the configuration of a computer system according to a preferred embodiment of the invention.

FIG. 1 is a block diagram showing the configuration of a computer system according to a preferred embodiment of the invention, comprising a management computer 1, two host computers 401 and 402 (collectively represented as a host computer 4), and two storage subsystems 501 and 502 (collectively represented as a storage subsystem 5). The management computer 1 collects information on the usage of storage inside the computer system and displays it on the display device 3. The host computers 401 and 402 both connect to two storage subsystems 501 and 502 and carry out jobs while using storage areas in the storage subsystems 501 and 502 in a shared or non-shared manner.

First, the configuration of the management computer 1 will be described.

The management computer 1 is equipped with a keyboard 2 for entering request commands and a display device 3 for displaying the status of storage usage.

The management computer 1 further comprises a CPU 11, which is an instruction processor, an HDD 12, which holds data and programs, a memory 13, which serves as a storage into which programs to be executed are loaded and which also holds data to be accessed during program execution, and adapters 171, 172, 173, and 174, which interface with the communication paths for exchanging data to and from the host computer 4 and the storage subsystem 5.

The HDD 12 contains a group definition file 125 that specifies which volume belongs to which group. The memory 13 contains a volume information table generation unit 14, which generates integrated volume information by combining the information taken from the group definition file 125 and the information on the volumes used by the host computers 401 and 402 connected to the management computer 1, a volume information table 16, which holds the volume information thus generated, and a volume information acquisition unit 15, which, based on the information obtained from the volume information table 16, asks the storage subsystems 501 and 502 to provide the information on the desired volume and displays the information obtained on the display device.

The structures of the group definition file 125 and the volume information table 16 will be described later with reference to FIGS. 5 and 6. In actuality, the volume information table generation unit 14 and the volume information acquisition unit 15 are the programs corresponding to the respective functions that are executed on the CPU 11. The actual processing will be described later.

The host computers 401 and 402 are connected to the management computer 1 through dedicated lines 7 and the adapters 171 and 172. The host computers 401 and 402 communicate with the management computer 1 through adapters 44 and 44', respectively.

The description of the configuration of the host computer 4 is now in order.

Since the host computer 401 and the host computer 402 in this embodiment have the same configuration, only the host computer 401 is taken as an example in the description below.

The host computer 401 comprises a memory 41, a CPU 42, and an HDD 43.

The HDD 43 maintains in the form of a configuration information file 431 the information on the volumes the host computer 401 can access. The memory 41 contains a configuration information send unit 415, which is a program for obtaining information from the configuration information file 431 that is executed by the CPU 42. As a result of the execution, information is read out from the configuration information file 431 and is sent to the management computer 1 through the adapter 44 and the dedicated line 7. The foregoing also applies to the host computer 402.

The description of the storage subsystem 5 is now in order.

The storage subsystem 5 communicates with the host computer 4 through a dedicated input/output channel 6. In the preferred embodiment shown in FIG. 1, the two storage subsystems 501 and 502 have an identical configuration. Therefore, while the description below mentions only the storage subsystem 501, it also applies to the storage subsystem 502.

The storage subsystem 501 comprises multiple volumes 52 and 53 and a disk control unit 51 that controls access to them. Each of the volumes 52 and 53 contains a volume directory 521 or 531, respectively, in a predetermined location which holds information on all the files (522 and 523, or 532 and 533, respectively) contained in, and managed by, it.

The volume directory 521 in the volume 52 holds and manages information on the files 522 and 523. Similarly, the volume directory 531 in the volume 53 holds and manages information on the files 532 and 533. The disk control unit 51 controls access to the volumes 52 and 53. The volume information management unit 515 obtains information on a desired volume from the volume directory 521 or 531.

Figure 2:
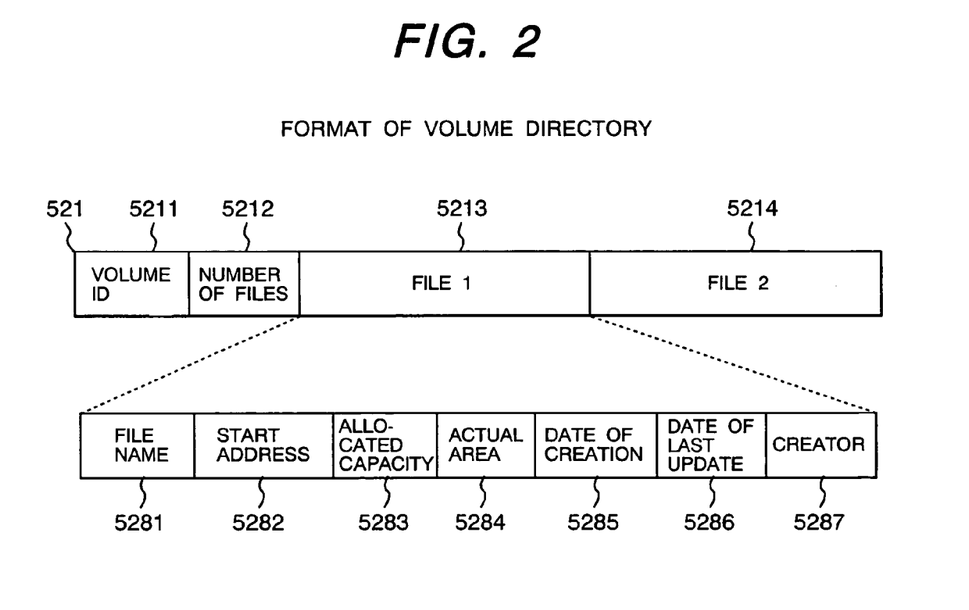
FIG. 2 shows the format of a volume directory 521 inside a volume according to a preferred embodiment.

The format of the volume directory 521 will now be described with reference to FIG. 2, which shows what information is registered in it. The volume directory 521 consists of a number of fields. A volume ID field 5211 contains the volume ID of the volume 52, which is VOL1 in this example. Similarly, the volume ID field of the volume directory 531 contains the volume ID of the volume 53, which is VOL2. A number of files field 5212 contains the number of files contained in the volume 52, which is 2 in this example. Subsequent fields 5213 and 5214 contain information on the individual files contained in the volume 52. As many such fields as there are files are prepared (in this example there are only two).

The file information field 5213 comprises a number of fields, including a file name field 5281 for holding the file name, a start address field 5282 which points to the start address of the file inside the volume 52, an allocated capacity field 5283 for holding the file size or the allocated capacity, an actual area field 5284 for holding the actual area used in the volume, a date of creation field 5285 for holding the date of file creation, a date of last update field 5286 for holding the date when the file was last updated, and a creator field 5287 for holding the name of the person who created the file. The file information field 5214 has a similar field configuration.

Each time a file is allocated in the volume 52, the relevant fields of the volume directory 521 are created or updated, as the case may be; each time a file is deleted from the volume 52, the relevant fields of the volume directory 521 are deleted or updated, as the case may be. During program execution, the contents of the file information field 5213 corresponding to any file that is being accessed are updated by the operating system (OS).

Now the process of obtaining and displaying the contents of the volume directory 521 will be described with reference to FIG. 3, which shows the structure of the configuration information file 431 in the host computer 401.

The configuration information file 431 contains information on the volumes accessible to the host computer 4. The configuration information file 431 comprises a storage subsystem ID field 4311 for holding the storage subsystem ID, a volume ID field 4312 for holding the volume ID, and a physical address field 4313 for holding the physical address of the volume inside the storage subsystem.

Figure 3:
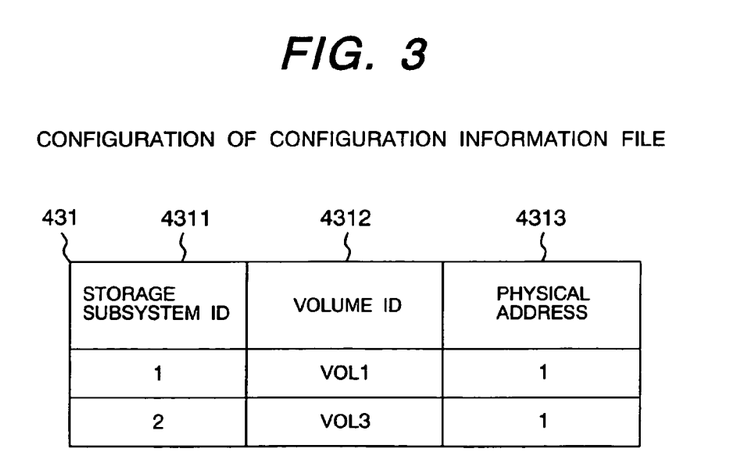
FIG. 3 shows the structure of a configuration information file 431 according to a preferred embodiment.

In the example shown in FIG. 3, two storage subsystems 501 and 502, given the IDs "1" and "2," respectively, are represented as "1" and "2" under the storage subsystem ID field 4311. FIG. 3 indicates that the host computer 401 can access VOL1 (52 in FIG. 1) in the storage subsystem 501 and VOL3 (52' in FIG. 1) in the storage subsystem 502.

The contents of the configuration information file 431 are read out and sent to the management computer 1 by the configuration information send unit 415.

Figure 4:
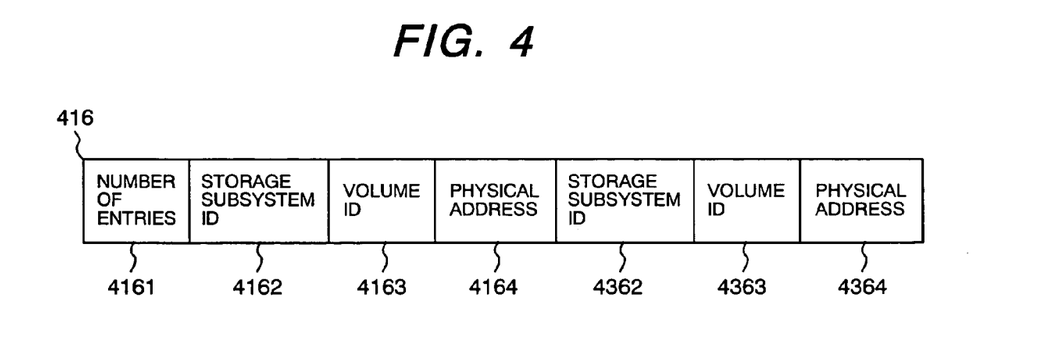
FIG. 4 shows the record format used during transmission of a configuration information file according to a preferred embodiment.

FIG. 4 illustrates an example of the record format of the information sent from the configuration information send unit 415 to the management computer 1. This record comprises a number of fields that are grouped into several groups, each corresponding to one volume or file management. A number of entries field 4161 contains the number of entries, i.e., the number of volumes whose information is contained in this record, which is "2" in this example. This field is followed by as many groups of fields as there are volumes covered in this record, each group consisting of three fields: a storage subsystem ID field 4162 or 4362 for holding the storage subsystem ID, a volume ID field 4163 or 4363 for holding the volume ID, and a physical address field 4164 or 4364 for holding the physical address, corresponding to VOL1 or VOL3, respectively.

Each time the host computer 401 is brought up, the contents of the configuration information file 431 are read out and sent to the management computer 1 by the operating system. It should be understood that the contents of the configuration information file 431' in the host computer 402 have the same format and are read out and sent to the management computer 1 in the same manner.

Now the structure of the group definition file 125 will be described with reference to FIG. 5.

The group definition file 125 is provided for ease of storage management by the system administrator. The volumes 52 through 53' are grouped by their use or purpose such as batch processing and online transaction processing, and each such group is assigned a group name.

The group definition file 125 is organized by the group name.

Figure 5:
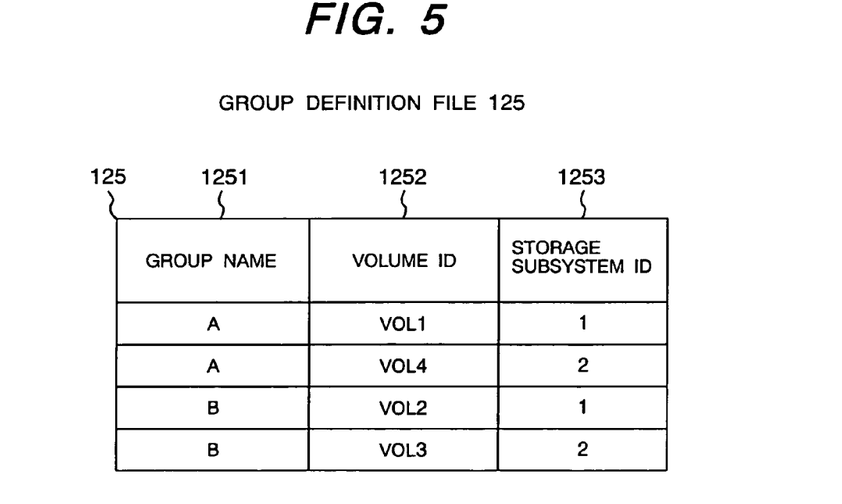
FIG. 5 shows the structure of a group definition file 125 according to a preferred embodiment.
Figure 6:
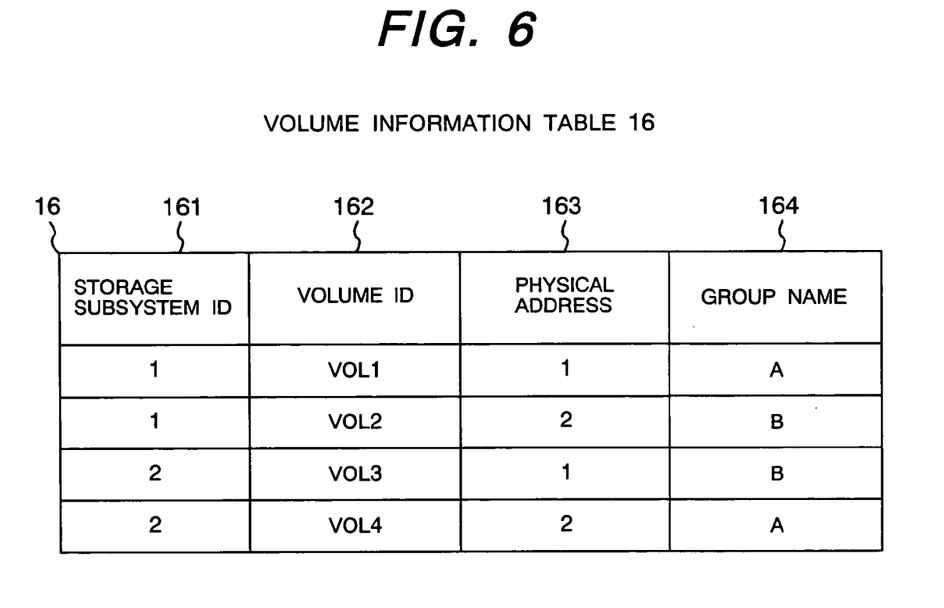
FIG. 6 shows the structure of a volume information table 16 according to a preferred embodiment.

As shown in FIG. 5, the group definition file 125 comprises a group name field 1251 for holding the group name, a volume ID field 1252 for holding the volume ID, and a storage subsystem ID field 1253 for holding the storage subsystem ID. In the example given in FIG. 5, VOL1 and VOL4 belong to Group A, while VOL2 and VOL3 belong to Group B.

Each time the host computer 401 or 402 is brought up and the contents of the configuration information file 431 or 431' are sent through the configuration information send unit 415 or 415', respectively, the contents of the volume definition file 125 are referenced and merged with the former to create a volume information table 16. FIG. 6 shows the structure of the volume information table 16. The volume information table 16 comprises a storage subsystem ID field 161 for holding the storage subsystem ID, a volume ID field 162 for holding the volume ID, a physical address field 163 for holding the physical address, and a group name field 164 for holding the group name. FIG. 6 lists all the volumes in the system, VOL1, VOL2, VOL3, and VOL4.

The volume information acquisition unit 15 checks the contents of the volume information table 16. It then identifies the registered volume or volumes, based on the volume ID or group name specified by the system administrator, determines which of the volume directories 521 through 531' should be accessed, and issues a volume information request to the volume information management unit 515 or 515' in the disk control unit 51 or 51' to which the volume directory thus determined belongs. The volume information thus obtained is then sent to and displayed on the display device 3.

Figure 7:
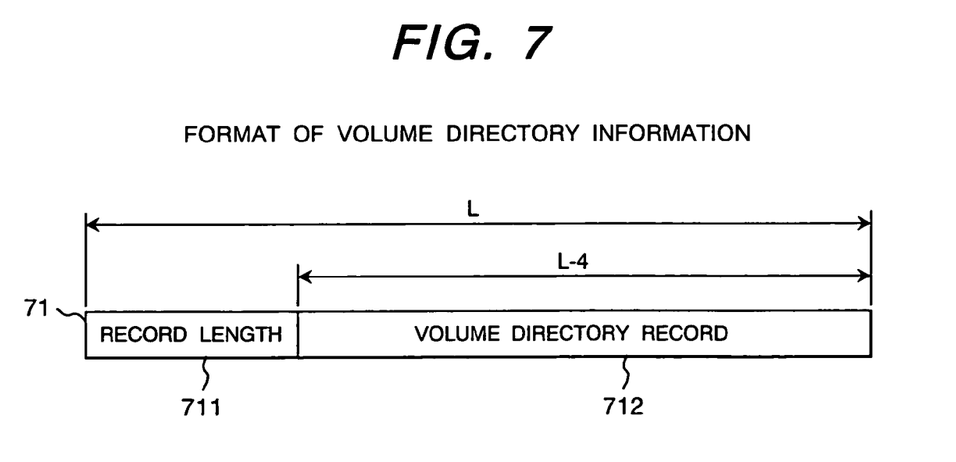
FIG. 7 shows the record format used during transmission of volume directory information according to a preferred embodiment.

FIG. 7 shows the format of the volume directory information sent from the volume information acquisition unit 15 to the display device 3.

The volume directory information record 71 consists of a record length field 711 and a volume directory record field 712. The record length field 711 itself is 4 bytes long and contains the length of the volume directory information record including these 4 bytes. For each volume directory, one volume directory information record 71 is created. If there is more than one volume directory that needs to be covered, more than one volume directory information record 71 is created and sent to the display device accordingly.

How information on the configurations and other aspects of volumes is displayed on the display device 3 is described below, taking the example shown in FIG. 9.

The screen on the display device 3 consists of an information display section 31 and a scroll control section 32. On the information display section 31, the information on the volumes belonging to the group specified through the keyboard 2 is displayed. FIG. 9 shows the information on Group A being displayed.

The information display section comprises a number of fields including those for displaying a group ID (i.e. a group name) 311, storage subsystem IDs 312, volume IDs 313, file names 314, allocated capacities 315, actual areas used 316, and utilization rates 317. In this example, the group ID 311 is "A" and the volume ID field lists "1" and "2," which are the IDs of the volumes belonging to Group A.

Since the storage subsystem 501, which has an ID of "1," contains the volume 52 that belongs to Group A, "1" is shown in the storage subsystem ID field 312 and "VOL1," which is the ID of the volume 52, is shown in the volume ID field 313. The names of all the files contained in VOL1 are shown in the file name field 314. The information on each individual file such as the capacity allocated to it, the actual area used by it, and its utilization rate is shown in their corresponding fields 315, 316, and 317 of its row.

The information on the storage subsystem 502 whose ID is "2" and the files contained in it is also displayed in a similar manner: the volume ID of the volume 53' belonging to Group A and the information on the files allocated in the volume 53'.

As the system scale increases, it should be expected that the number of volumes belonging to one group and/or the number of files allocated to one volume also increase, causing the whole information not to fit in one screen. As a solution, a scroll section 32 is provided such that by scrolling, all the information can be displayed.

Figure 8:
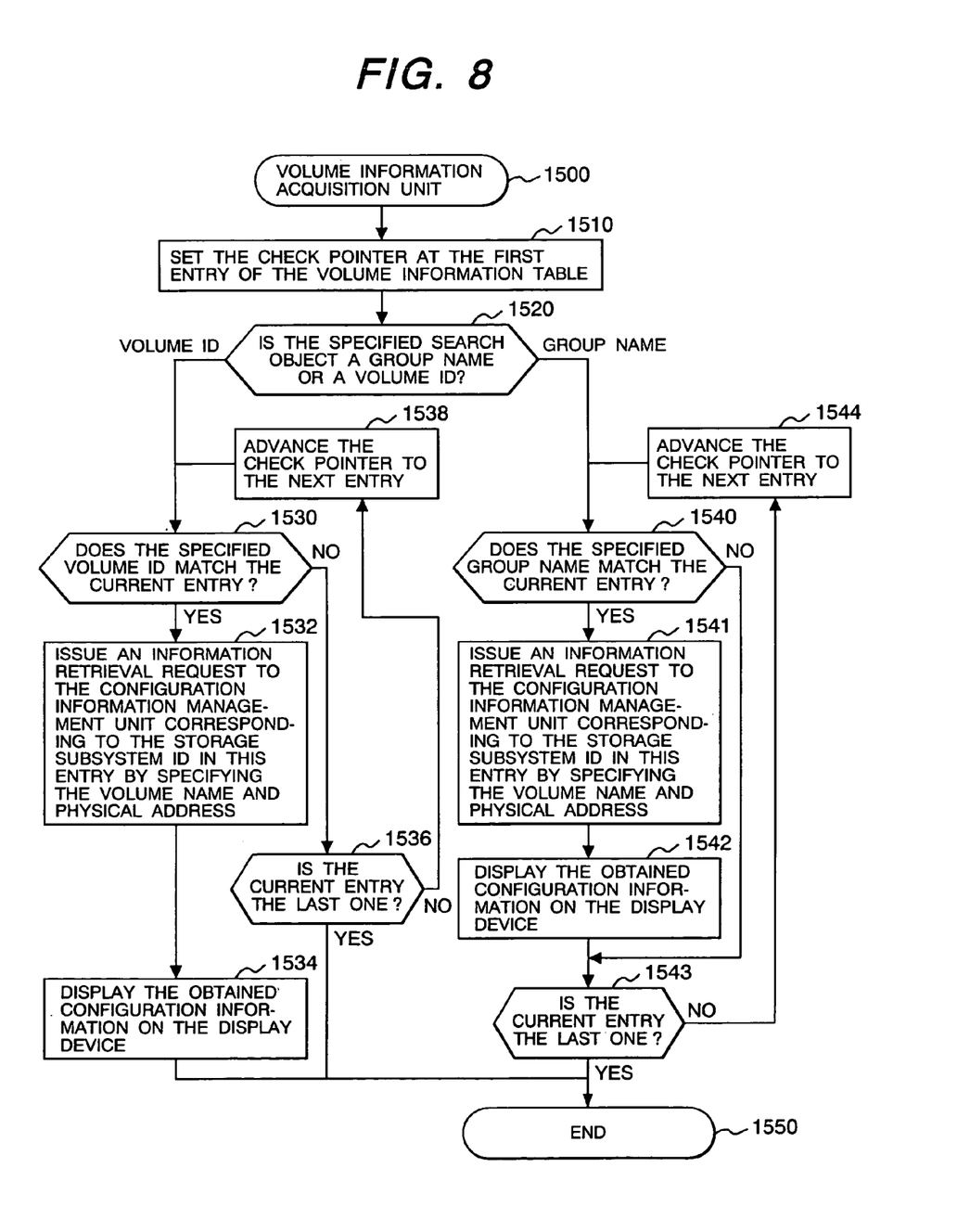
FIG. 8 is a flowchart showing the process carried out in the volume information acquisition unit 15 according to a preferred embodiment.

Next, the processing carried out by the volume information acquisition unit 15 will be described with reference to the flowchart given in FIG. 8.

More specifically, the processing described below is carried out by the CPU 11 executing a program contained in the volume information acquisition unit 15.

First, to specify the search object, the system administrator enters the volume ID or the group name through the keyboard 2. The volume information acquisition unit 15 enters the specified search object into the first entry of the volume information table 16 (1510). It then determines whether the search object specified through the keyboard 2 is a volume ID or a group name (1520). If it is a volume ID, the path to step 1530 is taken; if it is a group ID, the path to step 1540 is taken.

If the search object is a volume ID, then the volume information acquisition unit 15 determines whether the specified volume matches the entry currently being checked (1530). If it does, the volume information acquisition unit 15 issues an information retrieval request to the configuration information acquisition unit 515 or 515' corresponding to the storage subsystem ID in this entry by specifying the volume name and physical address contained in this entry.

If the specified volume does not match the entry currently being checked in step 1530, then the volume information acquisition unit 15 checks whether this entry is the last entry (1536). If it is not the last entry, the volume information acquisition unit 15 advances the check pointer to the next entry (1538) and returns control to step 1530. If the entry is indeed the last entry in step 1536, then the processing is terminated (1550).

If the specified volume matches the entry currently being checked in step 1530, the volume information acquisition unit 15 issues an information retrieval request to the configuration information management unit 515 or 515' corresponding to the storage subsystem ID in this entry by specifying the volume name and physical address contained in this entry. When, as a result of this request, configuration information is obtained from the configuration information management unit 515 or 515' corresponding to the storage subsystem ID, the volume information acquisition unit 15 sends it to the display device 3 in the format shown in FIG. 7. Once the information has been sent, the processing comes to completion (1550). In step 1520, if the specified search object is a group name, then the volume information acquisition unit 15 determines whether the specified group name matches the entry currently being checked (1540). If it does, the path to step 1541 is taken; if it does not, the path to step 1543 is taken.

If the specified group name matches the entry currently being checked, the volume information acquisition unit 15 issues an information retrieval request to the configuration information management unit 515 or 515' corresponding to the storage subsystem ID by specifying the volume name and physical address contained in this entry (1541). When, as a result of this request, configuration information is obtained from the configuration information management unit 515 or 515' corresponding to the storage subsystem ID, the volume information acquisition unit 15 sends it to, and have it displayed on, the display device 3 (1542). The volume information acquisition unit 15 then checks whether this entry is the last entry (1543). If the entry is indeed the last entry, then the processing is terminated (1550); if it is not the last entry, the volume information acquisition unit 15 advances the check pointer to the next entry (1544) and returns control to step 1540.

Figure 9:
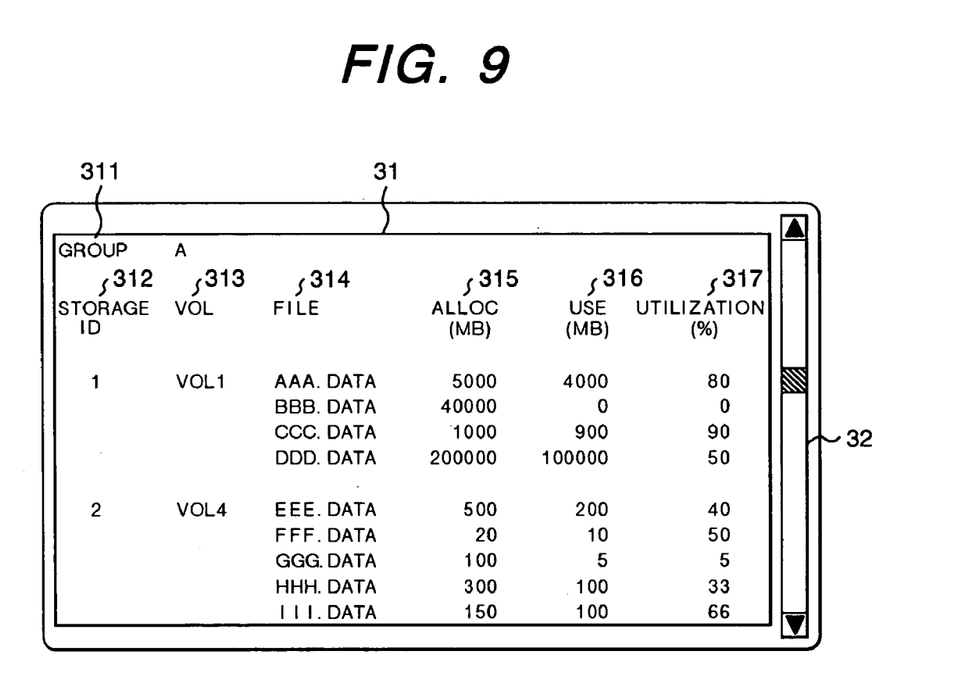
FIG. 9 shows an example of the screen displayed on a display device according to a preferred embodiment.

FIG. 9 shows an example of a screen displaying volume configuration information when Group "A" is specified as the search object.

Now another embodiment of the invention will be described below with reference to FIGS. 9 and 10.

In the first preferred embodiment described in the foregoing, the volume directories 521 through 531' are stored in a fixed location inside their corresponding volumes 52 through 53'. In contrast, in the alternative embodiment described herein, an index pointing to the storage location of each volume directory (521 through 531') is stored in a fixed location inside its corresponding volume (52 through 53'). This arrangement allows the volume directories 521 through 531' to be placed anywhere in their corresponding volumes 52 through 53'. FIG. 10 shows an example of this arrangement for the volume 52. An index 529, which holds the start address of the volume directory 521, is stored in a predetermined location in the volume 52. To access the volume directory 521, first its address needs to be obtained by accessing the index 529. Once the start address is obtained, the volume directory 521 can be accessed in the same manner as in the first preferred embodiment.

Figure 10:
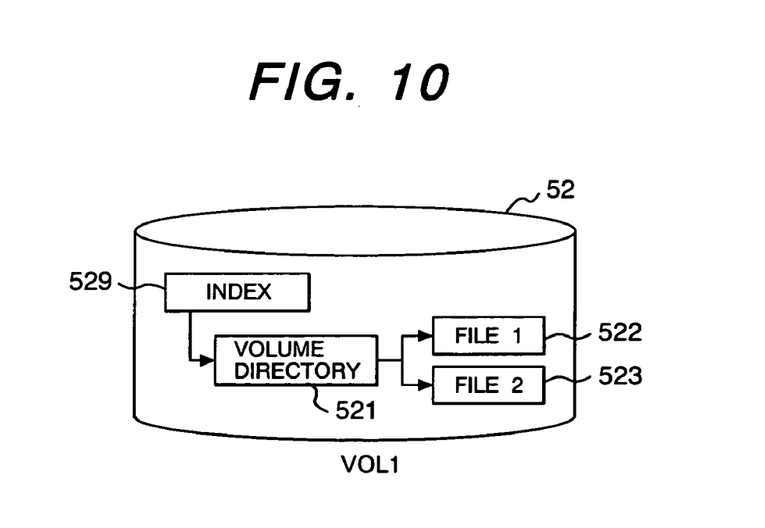
FIG. 10 shows the structure of a volume according to another embodiment of the invention.
Figure 11:
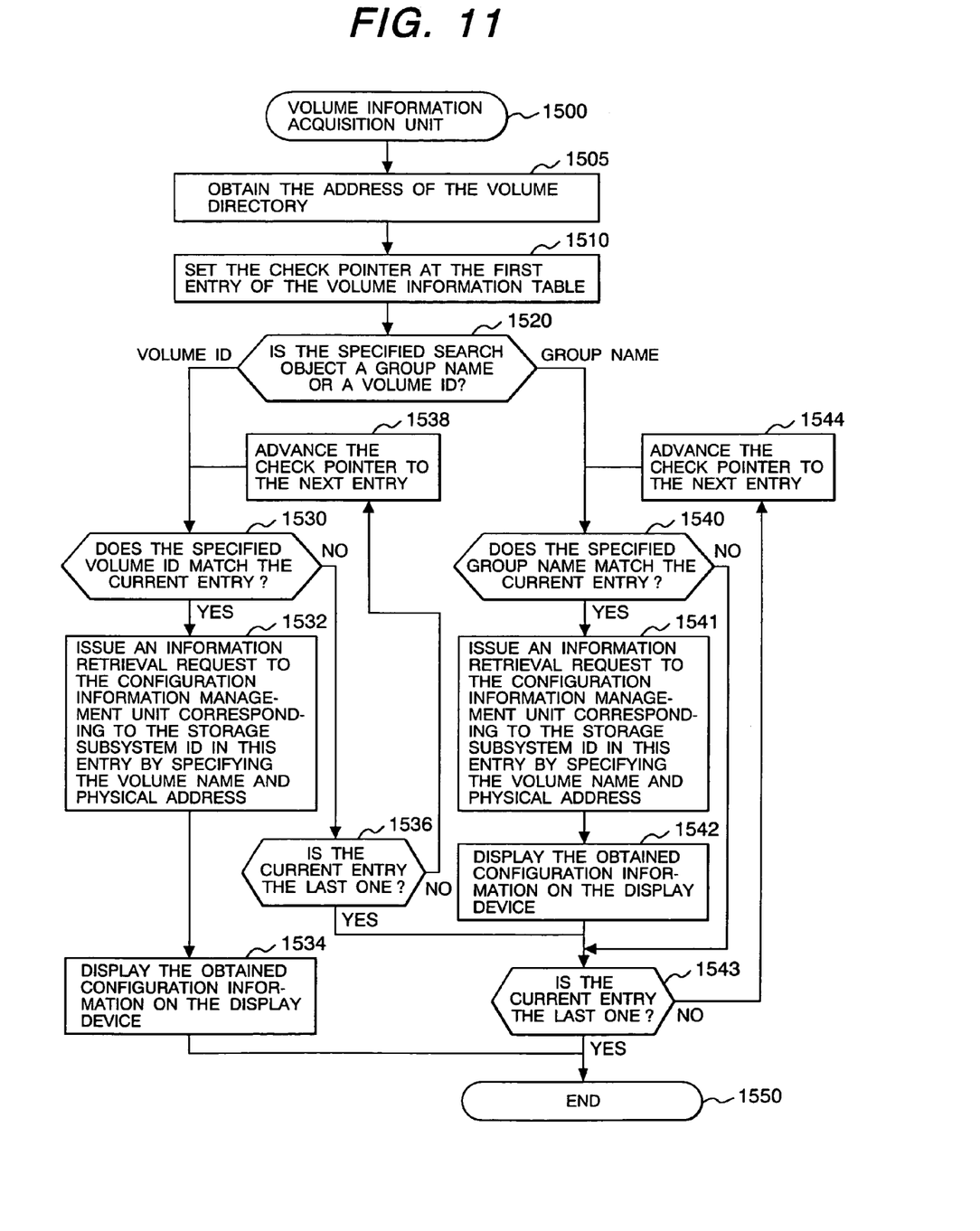
FIG. 11 is a flowchart showing the process carried out in the volume information acquisition unit according to another embodiment.

FIG. 11 shows the flow of the processing of the volume directory shown in FIG. 10 as carried out by the volume information acquisition unit 15. The only difference from the processing according to the first embodiment shown in FIG. 8 is that an additional step 1505 for obtaining the start address of the volume directory (521 through 531') is inserted. Other than that, all the foregoing description pertaining to the processing carried out by the volume information acquisition unit 15 remains the same.

Two embodiments of the present invention have been described. Nevertheless, it should be understood that various modifications may be made without departing from the spirit and scope of the invention.

For example, additional fields or items may be appended to, or some of the non-essential fields or items may be deleted from, the structures shown in FIGS. 2 through 7. Similarly, other pieces of information may be added to, or some non-essential information may be deleted from, the display shown in FIG. 9. For example, the display screen may be designed not to show the allocated capacity 315, the actual area used 316, or the utilization rate 317. Further, the host computer 4 shown in FIG. 1 may also be considered the OS of the user's computer. Therefore, it should also be understood that the invention is not limited by the specific illustrated embodiments but only by the scope of the appended claims.

The invention claimed is:

1. A storage system comprising a plurality of storage subsystems each containing one or more volumes and a management computer that manages the configuration of said storage subsystems and makes said volumes in said storage subsystems available to a host computer connected to said storage subsystems, wherein said host computer comprises a configuration information send unit that sends to said management computer the information on the configuration of volumes in said storage subsystems that are accessible to said host computer;

each of said storage subsystems comprises a volume directory and a volume information management unit that retrieves information on a desired volume from said volume directory and sends the retrieved information to said management computer; and said management computer comprises a volume information table which, for each of said volumes, holds, in a coordinated manner, information of volume configuration obtained from said configuration information send unit in said host computer including information of the storage subsystem to which each said volume belongs and a group ID pre-assigned to each said volume according to its use, a volume information acquisition unit which, for a specified said group ID, identifies the volumes belonging to said specified group ID, the storage subsystems said identified volumes belong to, and the desired volumes in said storage subsystems, and obtains information on said desired volumes from their corresponding volume directories, and a display device that displays information of at least usage of said desired volumes, wherein the usage of said volumes obtained from said volume information acquisition unit is displayed by group on said display device, wherein said host computer contains a configuration information file that holds, as volume configuration information, at least volume IDs of the volumes contained in the storage subsystems that are accessible to said host computer and information on physical addresses corresponding to said volume IDs, and said configuration information send unit obtains said volume configuration information from said configuration information file, wherein said volume information table additionally holds, for each said volume, in a coordinated manner, the volume ID obtained from said configuration information send unit, a corresponding physical address and an ID of the storage subsystem to which the each said volume belongs; and said management computer having a volume information table generating unit and a group definition file that includes information of the group IDs of the volumes, the volume IDs and the IDs of the storage subsystems, wherein said volume information table generating unit generates said volume information table by combining the information from the group definition file and the volume configuration information from said configuration information file information, wherein said volume information acquisition unit locates the storage subsystems said volumes belong to using the IDs of said storage subsystems, and obtains, by specifying volume names and physical addresses of said volumes, the information on said volumes registered in their corresponding volume directories.

2. The storage system of claim 1, wherein said volume directory contains, for each of said volumes, a volume ID, a number of files contained in said volume, and information on the files contained in said volume.

3. The storage system of claim 2, wherein said information on the files comprises, for each said file, the file name, the starting address within said volume, the allocated capacity, the actual area used, and the date of creation.

4. The storage system of claim 1, wherein said volume directory or information on a location of said volume memory is stored in a predetermined location in said volume.

5. A storage management method for managing usage of one or more storage subsystems each containing one or more volumes made available to a host computer, said storage management method comprising the steps of:

registering in a storage unit, for each group into which the volumes are classified by their uses, a group ID, volume IDs of the volumes belonging to the group, and IDs of the storage subsystems said volumes belong to;

registering in a memory, in a coordinated manner, the volume IDs of the volumes contained in the storage subsystems accessible to said host computer, physical addresses corresponding to said volume IDs, IDs of the storage subsystems said volumes belong to, and said group ID;

registering in a volume information table information of the storage subsystem to which each said volume belongs, and said group ID for each of said volumes;

in response to each specified group ID, identifying the volumes belonging to the specified group, locating the storage subsystems said volumes belong to, and obtaining, by specifying the volume IDs and physical addresses of said volumes, information on usage of said volumes;

displaying on a screen of a display device said information on the usage of said volumes sorted by said group ID, each of said storage subsystems contains, for each of the volumes contained therein, a volume directory which holds an ID of said volume, a number of files contained in said volume, and information on usage of said files;

each of said storage subsystems sends, as said information on the usage of said volumes, the information registered in said volume directory;

said screen of said display device displays information including said group IDs, the IDs of said storage subsystems, the IDs of said volumes, and, out of said information on the usage of said volumes sent from said storage subsystems, names of the files contained in said volumes and information on the usage of said files, wherein relationships between said group IDs, said volume IDs, and the IDs of said storage subsystems are registered in a group definition file;

the volume information table further includes information of the volume IDs of the volumes contained in said storage subsystems, the physical addresses corresponding to said volume IDs and the IDs of the storage subsystems said volumes belong to in a format maintaining coordination among the information either a group name or a volume ID may be input through an input device as a search object, whereupon the volume IDs and physical addresses of the volumes corresponding to the input are retrieved from said volume information table;

information on the desired volumes is retrieved from said volume directories using said volume IDs and physical addresses thus retrieved; and out of said information on the desired volumes retrieved from said volume directories, information is extracted including said group IDs, the IDs of said storage subsystems, said volume IDs, the names of the files contained in said volumes, the capacities allocated to said files, the areas actually used by said files, and the utilization rates of said files, and the extracted information is displayed on said screen.

* * * * *